J. W. BRYCE.
RECORDING LOCK.
APPLICATION FILED AUG. 18, 1919.

1,365,814.

Patented Jan. 18, 1921.
5 SHEETS—SHEET 1.

INVENTOR
James W. Bryce
BY
Kerr, Page, Cooper & Hayward
ATTORNEYS

J. W. BRYCE.
RECORDING LOCK.
APPLICATION FILED AUG. 18, 1919.

1,365,814.

Patented Jan. 18, 1921.
5 SHEETS—SHEET 2.

INVENTOR
James W. Bryce
BY
Kerr, Page, Cooper & Hayward
ATTORNEYS

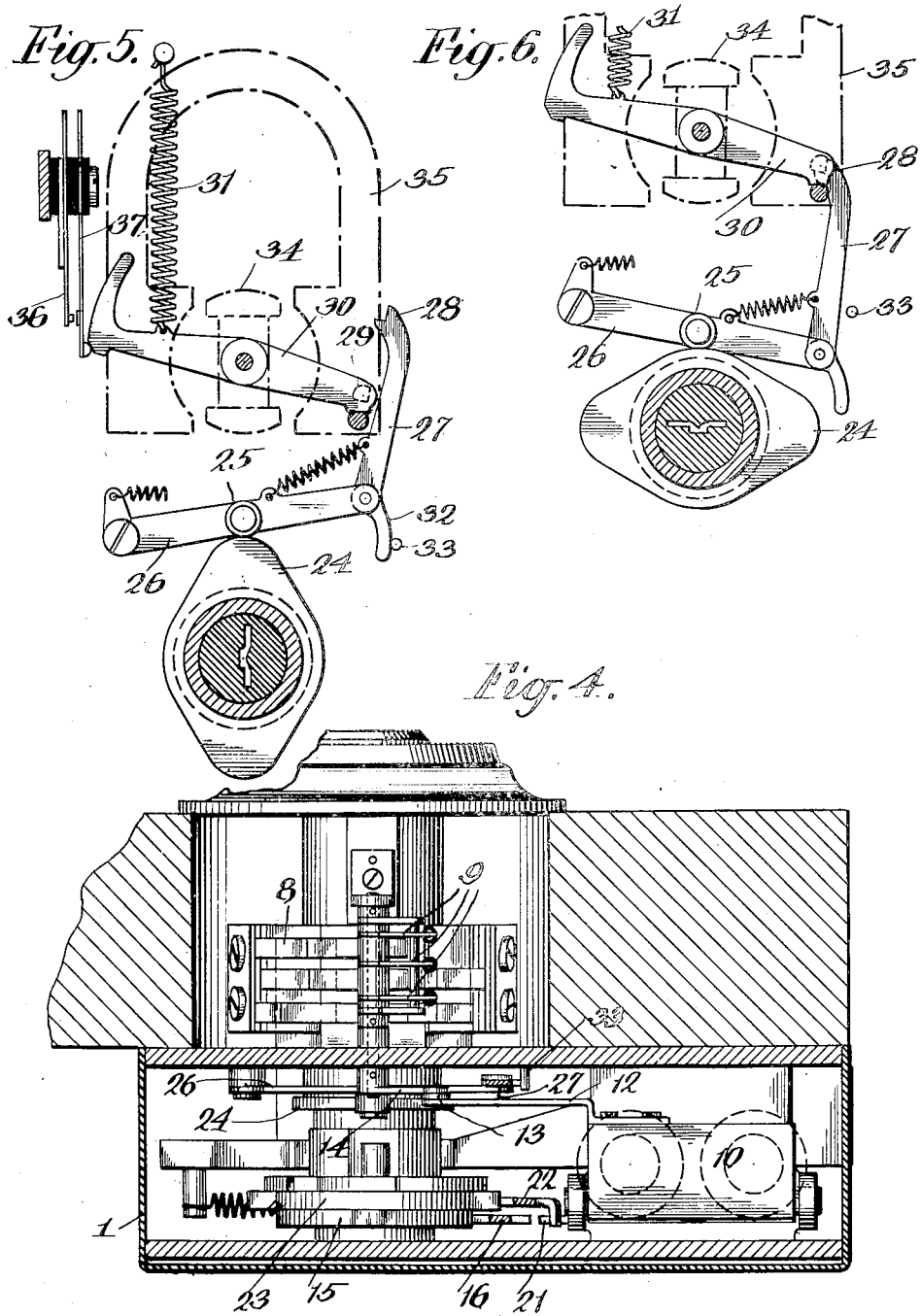

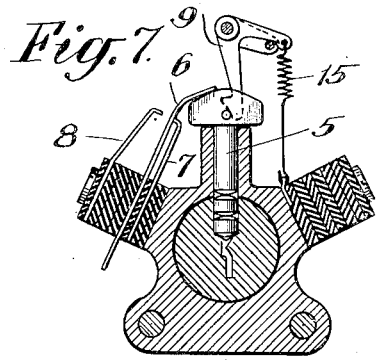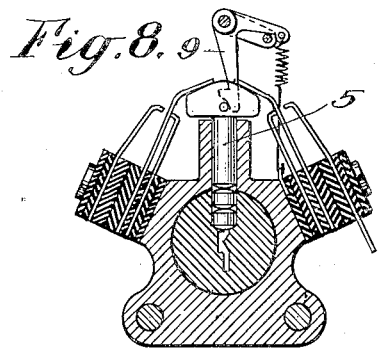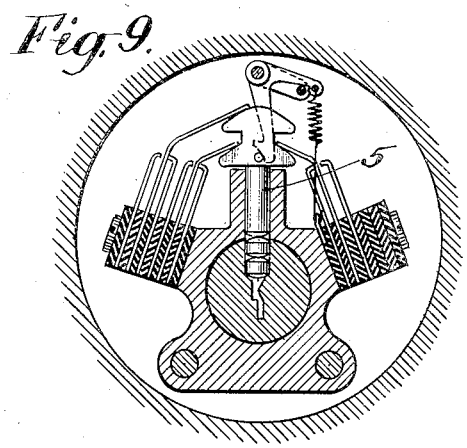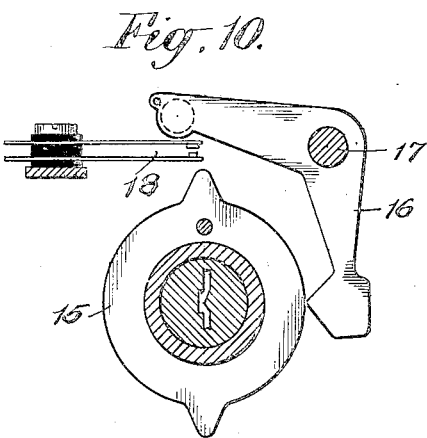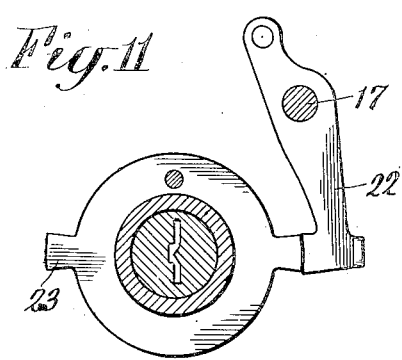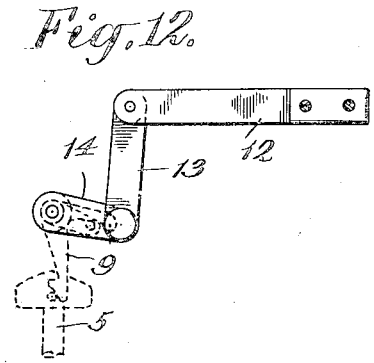

J. W. BRYCE.
RECORDING LOCK.
APPLICATION FILED AUG. 18, 1919.

1,365,814.

Patented Jan. 18, 1921.
5 SHEETS—SHEET 5.

Fig. 13.

Inventor
James W. Bryce
By Attorneys
Kerr, Page, Cooper & Hayward

UNITED STATES PATENT OFFICE.

JAMES W. BRYCE, OF BINGHAMTON, NEW YORK, ASSIGNOR TO THE INTERNATIONAL TIME RECORDING COMPANY, OF NEW YORK, N. Y., A CORPORATION OF NEW YORK.

RECORDING-LOCK.

1,365,814.     Specification of Letters Patent.     Patented Jan. 18, 1921.

Application filed August 18, 1919. Serial No. 318,232.

*To all whom it may concern:*

Be it known that I, JAMES W. BRYCE, a citizen of the United States, residing at Binghamton, in the county of Broome and State of New York, have invented certain new and useful Improvements in Recording-Locks, of which the following is a full, clear, and exact description.

The invention for which Letters Patent is now sought is an improvement in registering lock systems. Such a system comprises one or more locks which when operated by suitable keys, establish the proper mechanical and electrical relations in the means employed to operate a recorder, to show any one or more of various data, such as the particular key used; the particular lock used, and the like.

In such systems as usually equipped, means are provided for showing whether a key was inserted from the inside or the outside of a particular door, and to show also the exact time of the operation of the lock, but the present application being based upon improvements in such systems, I shall show and describe herein only such parts of the system as embody these improvements, all other features and details being left to the skilled worker in the art to supply in case of need.

The improvements to which I shall confine the description and claims reside partly in the lock proper, and partly in the arrangement or combination of mechanism in the recorder, and as to these latter it may be stated at the outset that they involve no new devices and hence they are illustrated merely in diagram, a wide choice being left for the selection of any known means which will perform their allotted functions.

The nature of the improvement may be gathered as readily from a consideration of the construction of the device employed as from any general statement of its character and purpose. I therefore refer to the drawings hereto annexed for its explanation.

Fig. 4 is a horizontal section of the lock mechanism.

Fig. 5 is a detail diagram of a magneto and its operating devices in the lock.

Fig. 6 is a similar view of these parts in another operative position.

Figs. 7, 8 and 9 are details of plungers designed to be set by the insertion of a key to establish electrical combinations to indicate the particular key used.

Figs. 10, 11 and 12 are enlarged details of parts used in the lock.

Fig. 13 is a diagram of the system showing the arrangement of means used in both the lock and the recorder.

Figure 2:
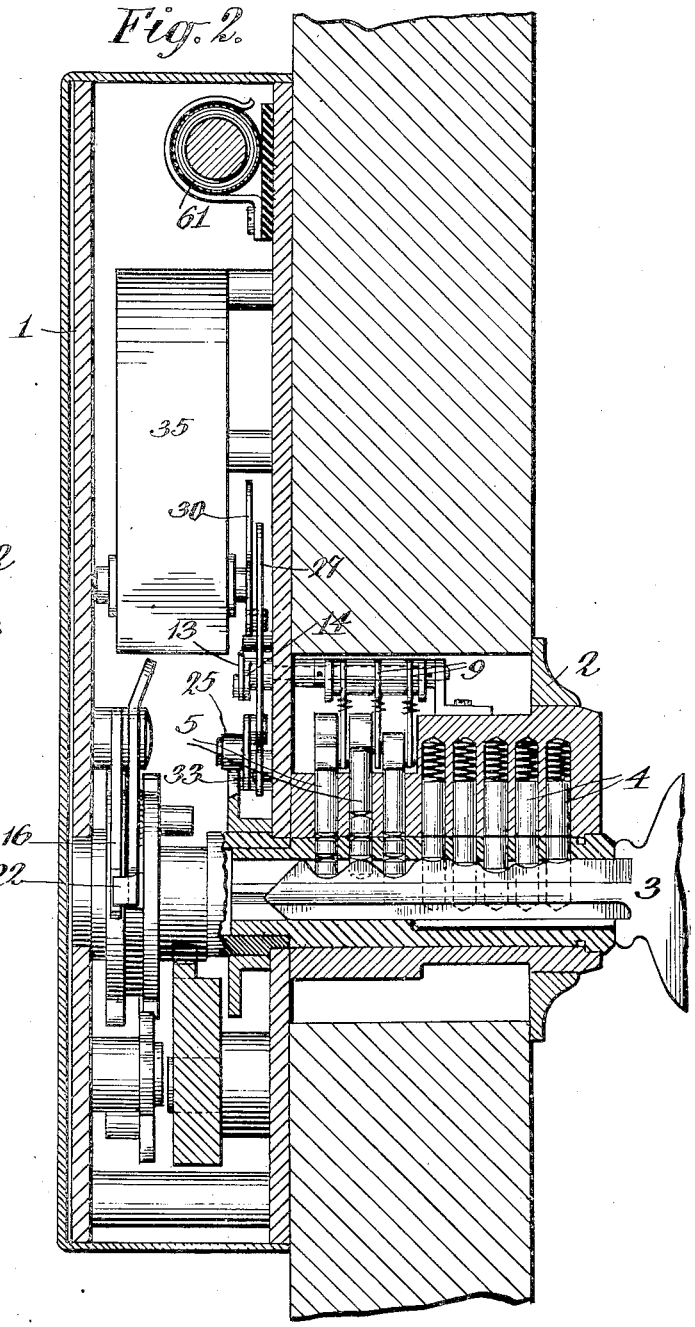
Fig. 2 is a vertical sectional view of the mechanism shown at the left hand side of Fig. 1.

The lock proper is best shown in Fig. 2. In this figure a lock adapted to be operated from one side only is shown as comprising a casing 1, which is properly secured to a door, and having the usual extension 2 for containing the tumblers and the key-seat. The key 3, when inserted in the lock, sets the lock tumblers 4 and is purposely extended to set a plurality, usually three, of combination tumblers 5. These elements are not broadly new to this case, but as they play an important rôle in the operation of the lock as a whole their construction and functions will be described in some detail.

Referring to Figs. 7 to 9; one of the tumblers 5 on being raised, engages the center one 6 of three contacts, shifting it from contact 7 to contact 8. The second tumbler in like manner breaks two contacts and closes two while the third tumbler breaks three contacts and makes three. One, any two, or all of these tumblers are raised by each key inserted in the block and by the circuit connections thus made and broken, any one of eight different paths may be established, as will be seen by an examination of the upper left hand portion of the diagram, Fig. 13. That is to say, if the tumbler which makes and breaks but one connection be raised, then the contact $6^a$ operated thereby breaks the contact $7^a$, but establishes a path through $8^a$ and thence through contacts $7^b$ and $7^c$.

When the electromagnet 11 is energized it attracts its armature 10 which draws upwardly upon the arm 12, link 13 and arm 14. This movement of the arm 14 causes all of the latch levers 9, which are secured to the same rock shaft to which the said arm 14 is secured, to move out of engagement with the corresponding pins on the plungers 5. All of the plungers 5 then drop unless there is a key in the lock, in which event certain of the plungers will be held up by the key.

If the tumbler which makes and breaks two contacts be raised, then the path will be from 7ª to 8ᵇ to 7ᵈ to line and following this plan it will be found that by the permutations and combinations of raised tumblers seven separate paths may be established.

When a tumbler is raised a pivoted latch lever 9 engages with a pin on its head and holds it in its raised position until the latch is released by the movement of the armature 10 of an electromagnet 11, to which armature is affixed an arm 12, Fig. 12, connected by a link 13 with a right-angled arm 14 of the latch 9.

When a key is inserted in the keyhole and turned it rotates a series of disks mounted on the inner end of the key barrel, which have different functions which will be set forth as occasion requires. One of these disks 15 has two rounded projections and by turning the key 90° in either direction one of these projections engages and shifts to the right a lever 16 pivoted at 17, and brings its right-angled end down upon two contacts 18 throwing a magnet 19 into the line, as will be seen from Fig. 13. If, therefore, any other lock in the system is being operated and current is flowing on the line, this magnet 19 will be energized and will draw up its armature 20, which carries at one end a cam 21, which engages with the end of a pivoted lever 22, and causes that lever to lock with one or the other of projections 23 on another disk and hence stops the further rotation of the key. If, however, no other lock is being operated, magnet 19 is not energized, the lever 22 not shifted and hence the key is free to be turned and the lock may be operated.

The turning of a key in the lock rotates a double cam disk 24, Figs. 5 and 6. One of the high parts of this cam normally rests under a roller 25 on a pivoted lever 26, and said lever is raised, but after the key has been turned 95° or to the position shown in Fig. 6, this lever is lowered bringing with it a spring-actuated arm 27, pivoted to its end, until a notch 28 in the end of said arm engages a stud 29 on a pivoted lever 30. The further rotation of the key again raises the lever 26 and turns the lever 30 against the force of a spiral spring 31 until a toe 32 on the lever 26 encounters a fixed stop 33 which operates to shift the arm 27, and release its notched end from the stud 29.

The shaft of the lever 30 carries also the armature 34 of a magneto 35 so that when the lever 30 is released, as above described, the armature 34, under the impelling force of the spring 31, generates a current impulse. The end of lever 30, moreover, is so formed that while in movement it brings together two contacts 36, 37, and thereby connects the magneto to the line during the period in which it is generating a current impulse.

I have now described practically all of the details of the lock proper an understanding of which will contribute to that of the system as a whole and attention may now be directed to the diagram, Fig. 13.

Each lock has its own circuit to the recorder, and I have shown three of such circuits, 38—39, 38′—39′, 38″—39″, but as one is the counterpart of another, the description will be confined to that indicated by the numerals 38 and 39. Assuming, therefore, that the lock on that circuit has been operated, the magneto current flows over wire 38, through the left hand coil of a double relay 40 and thence by wire 41 to back stop of a relay 42, thence by wire 43 and the back stop of relay 40 back to the lock through the line wire 39 and electromagnet 11.

Energization of the releasing magnet 11 unlocks the plungers 5. It will be observed that such unlocking cannot take place after a key has been inserted until the lock has been operated.

This circuit impulse, moreover, energizes the relay 40 which has two armatures, one of which 44 closes a contact connected with one side of a local power circuit 45 with a wire 46 and forms a path through cam-controlled contacts 47 to and through a direct current motor 48 to the other side of the line 49.

The motor 48 drives a direct current generator 50 and the current which it generates may follow one of several paths. For example, it may flow through wire 51, to the middle point of a double coil oppositely wound relay 52, and thence by wire 53 to one of the front stops 55 of the relay 40, thence by armature 54 to wire 39, thence through the particular key indicating circuit established by the tumblers 5 to wire 38, and thence by wire 56, back to the generator 50.

Another path is through wire 51 to the middle point of relay 52, thence by wire 57 to a mechanically moved contact 58, and back to the generator through the contacts 59 over which the contact arm 58 sweeps.

A third possible path is by wire 60 to the front stop of relay 42 which has been energized by the current in the closed main circuit, and thence by such of the wires 43 as do not pertain to the lock under operation and thence through the back stop of relay 40 not then energized to the lines which include the lock magnets 19 and thus prevents the operation of any lock other than that in use.

Following the first two currents above described for observing their effects, it will be seen that the terminals of the combination paths set by the tumblers 5 are connected to line wire 38, through resistances 61 so arranged that each path has a different resistance. The current, therefore, which flows through the left hand coil of relay 52 will have a different strength for each combination path that may be active or for each key that may have opened such path.

On the other hand, the contacts 59 are connected with the generator circuit through resistances 62 corresponding to the resistances 61, and as the contact arm 58 is swept mechanically over these contacts the current through the right hand coil of relay 52 will go through the same variations as that in the left hand coil. There will be a time, therefore, during each cycle of operation when the current in the right hand coil will be equal to that which passes through the other and the selected combination circuit. At such moment, the magnetizing effects of both coils being equal and opposite, the armature 63 of said relay will fall back onto a contact 64 and this connects up in circuit with the generator a magnet 65 which sets the type wheel of the recorder, not shown in the drawing, to indicate the particular key used.

During each cycle of operation also, a contact arm 66 is caused mechanically to sweep over three contacts 67, assuming there be three locks used, and one of the circuits thus formed will be rendered active by the fact that wires 68 leading from contacts 67 connect with front stops of the relays 40 and are thus connected to one side of main circuit when relay 40 is energized, while the contact arm 66 is connected by wire 70 with the other side of the main circuit and includes a magnet 69, that sets the type wheel in the recorder that indicates the particular lock used.

The details of the construction of the recorder are not of the essence of this invention, and in its construction it may follow well and widely known standards. It is known, for example, that all such recorders have a motor corresponding to the motor 48, which when started in operation rotates a shaft that controls the operation of cam contacts such as 47, to limit the movement to one rotation. The same power device shaft may also mechanically control the movement or operation of such contact arms, as 58 and 66, and perform such other operations as for instance printing from adjusted type-wheels; feeding a paper and the like.

Figure 1:
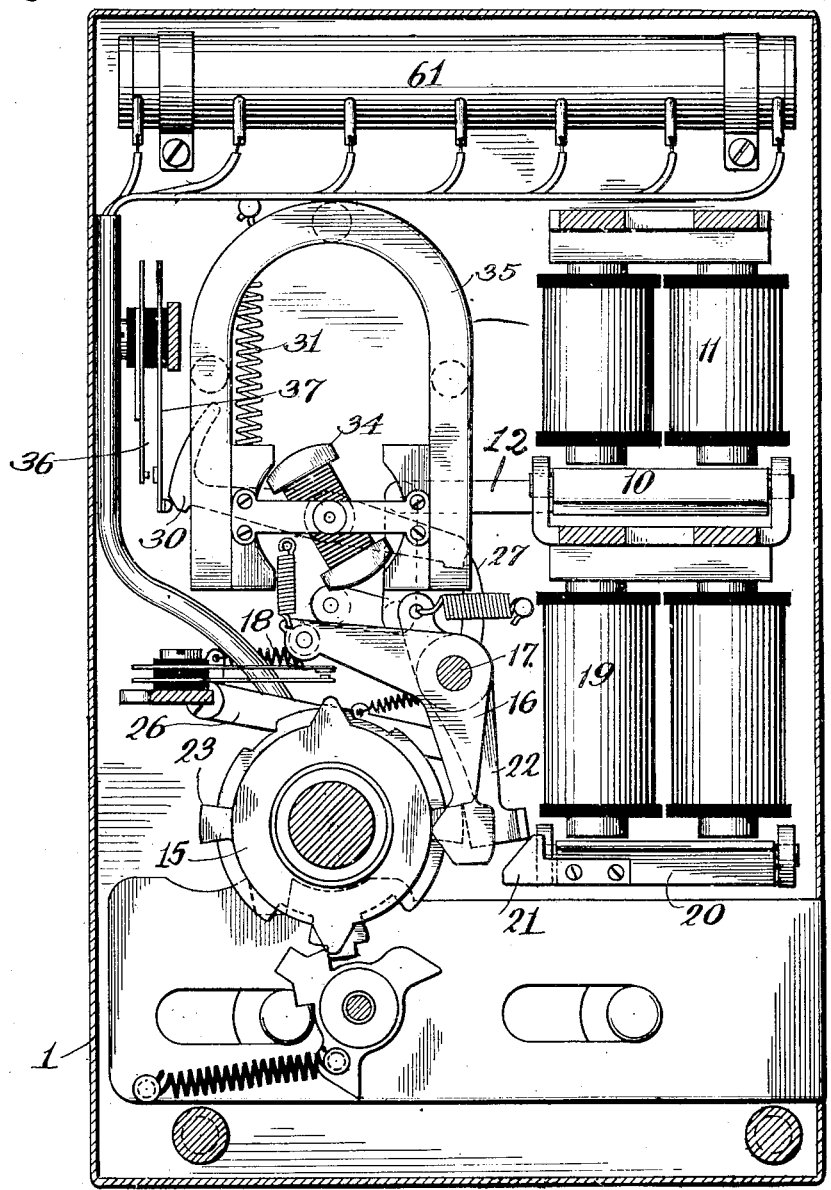
Figure 1 is a view in elevation of the lock proper, the side of the casing therefor being removed to exhibit the interior mechanism.
Figure 3:
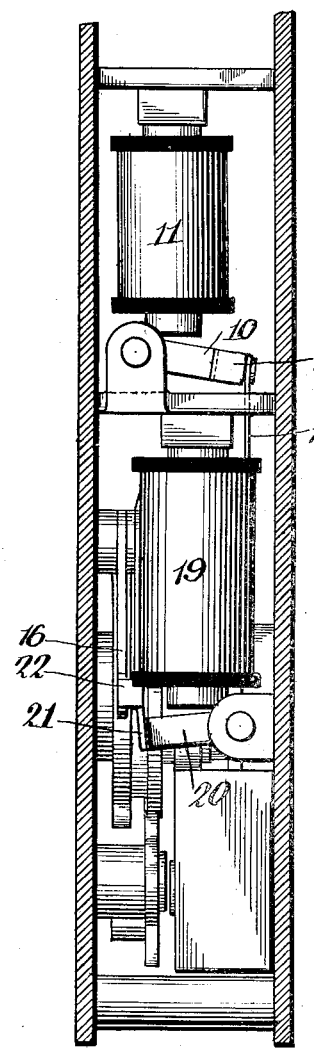
Fig. 3 is a similar sectional view of the parts shown at the right of Fig. 1.

While the operation of the system should be apparent to those skilled in the art in view of the preceding explanation, it may be more fully set forth as follows. Suppose an operator inserts his key at the key station indicated diagrammatically at the upper left of Fig. 13. This causes certain of the plungers 5 to be raised. If the key is now turned in either direction to a sufficient extent, one or the other of the projections on the disk 15 (see Fig. 10) will engage the lever 16 and cause the closure of the switch 18. If the line 38—39 is dead at this time the electromagnet 19 will not be energized, even though switch 18 is closed, and the lug 23 (see Fig. 11) will not engage the stop at the lower end of the lever 22. In other words, if the line 38—39 is dead when the key is rotated sufficiently to cause switch 18 to close, the key may be rotated further. On the other hand, if the line 38—39 is energized at the time the switch 18 is closed, the electromagnet 19 will be energized to cause the lower end of the lever 22 (Figs. 1 and 11) to be projected into the path of one or the other of the lugs 23 (depending upon which direction the key was rotated). This will prevent further rotation of the key and the magneto 34 cannot be actuated.

Returning to the assumption that the line 38—39 is dead, rotation of the key to an extent sufficient to cause closure of switch 18 causes the member 24 to assume the position shown in Fig. 6. Further rotation of the key causes the magneto to generate a current impulse in the manner previously described in detail. This current impulse energizes the electromagnet 11 to release those of the plungers 5 which have been raised by a preceding key, leaving raised only those plungers 5 which are held raised by the key now in the lock. The magneto current impulse passes over the following path or circuit: from armature 34 through line wire 38, left hand coil of relay 40, one of the back contacts of relay 42, one of the back contacts of relay 40, line wire 39, electromagnet 11 and switch 36 to the magneto. Relay 40, being thus energized, attracts its armatures to close the following circuit: conductor 45, through right hand coil of relay 40, armature 44, switch 47, motor 48, relay 42 and conductor 49. Here it will be noted that, although the circuit through the pick-up (or left hand) coil of the relay 40 is broken on attraction of the armatures of said relay, these armatures will be held in attracted position so long as the stick or holding coil (i. e., the right hand coil) of said relay is energized by the circuit last traced in detail. This means that so soon as the key has been rotated to an extent sufficient to cause the magneto to send its impulse, the key may be withdrawn from the lock. When the key is withdrawn the locking members 9 hold those of the plungers 5 which have been operated in their raised position.

Energization of the circuit last traced and including the holding coil of relay 40 accomplishes a number of functions. Thus the motor armature 48 will rotate thereby actuating generator 50, arms 58 and 66 and, at say the end of one revolution of the motor, the switch 47 will open momentarily. Energization of the relay 40 causes energization of the left hand coil of the relay 52 through the following circuit: from generator 50 through the last mentioned coil, front contact 55 of relay 40, line wire 39, through certain of the tumbler actuated switches depending on the particular key, line wire 38, wire 56 to the generator. The left hand coil of the relay 52 will therefore be energized by a current whose value depends on the particular key inserted. The right hand coil of the relay 52 is energized through the following circuit: generator 50, through the last mentioned coil, wire 57, switch 58 (which is actuated by the motor 48) to generator 50. When the magnetomotive-force of the right hand one of the coils 52 is of the same value as that of the left hand coil the armature 63 will be released to energize the type controlling wheel 65. Now it will be seen that the time, in the rotation of the arm 58, at which this condition of balance between the coils of relay 54 is established depends on the particular tumbler switches which have been actuated, or in other words on the particular key employed. This function may be utilized by selecting a proper type setting device (the specific detail of which forms no part of the present invention), to be actuated or controlled by relay 65 with the result that a record corresponding to the particular key employed will be produced.

The operation of that part of the system which relates to the production of a record indicative of the particular lock operated may be described briefly as follows: Each of the studs 67 is adapted to be connected through a back contact of a corresponding one of relays 40 to the local line wire 45, the switch arm 66 being connected through electro-magnet 69 to the opposite local line wire 49. This means that the magnet 69 will be energized at a time, in the revolution of arm 66, depending on which of the relays 40 has been energized, or in other words depending on which lock has been operated. Magnet 69 may therefore be employed to cause a record, indicative of the particular lock operated, to be produced.

Assuming that any particular lock has been operated as above described and the key has been withdrawn but the motor 48 has not completed its cycle, it will be impossible to operate the same lock until the said motor has completed its cycle. To explain this more fully, in connection with the upper left hand lock in Fig. 13, so long as the holding coil of the relay 40 is energized (and it will be until a break occurs at switch 47) the circuit including the left hand coil of relay 52 and line wires 38—39 are energized. Line wires 38—39 being energized it will be impossible to rotate a key in the lock in question far enough to actuate the door lock. This will be clearly understood in view of the previous explanation of the action of elements 18, 19, 22 and 23, when line wires 38—39 are alive.

Another and very important function is accomplished by energization of the relay 42. When any particular lock is actuated and the consequent cycle of the motor 48 has been started, it will be impossible to actuate any other lock or its magneto until the said cycle has been completed. Thus so long as relay 42 is energized the following circuits are closed: generator 50, wire 56, line wire 38', line wire 39', one of the back contacts of the middle one of relays 40, a front contact of relay 42 to generator 50; also, generator 50, wire 56 line wire 38'', line wire 39'', one of the back contacts of the lower one of relays 40, a front contact of relay 42 to generator 50. Any attempted rotation of a key in either of the door locks associated with lines 38'—39' or 38''—39'' to an extent sufficient to actuate that lock or its magneto will be prevented by the particular locking coil 19 (and associated mechanism) corresponding to that lock.

What I now claim as my invention is:

1. A recording lock comprising a magneto and means operated by the rotary movement of the key in said lock to set the magneto under tension and then release it, in combination with a recorder and a circuit between the lock and the recorder over which recorder controlling impulses of current from the magneto may be transmitted.

2. In a recording lock, the combination of tumblers raised and set by the insertion of a key to establish circuit paths corresponding to the key used, latches for locking said tumblers in their raised positions, an electro-magnet for releasing said latches, a source of current controlled by the lock, a circuit therefrom including in series the said magnet and all of the possible combination circuit paths, whereby the tumblers are released only after the lock has been operated.

3. In a recording lock, the combination with a key-actuated cam of a magneto, a spring actuated lever fixed to its armature shaft, a lever actuated by the cam and adapted to raise the armature lever against the force of its spring and then release the same when the key is turned in the lock whereby the normal use of the key will cause the magneto to generate an impulse of current.

4. In a recording lock system, the combination with a lock and means therein for closing circuit paths of different resistance corresponding to the key inserted into the lock, of a recorder, a double and oppositely wound relay therein, a mechanically operated rheostat in circuit with one of the coils of said relay and circuit connections through the other to the key controlled circuit in the lock, whereby when the currents, due to the resistance in the two coil circuits, are equal, the relay is deënergized and means operative on and by such deënergization to operate means to indicate the particular circuit path closed in the lock or the key corresponding thereto.

5. In a recording lock system, the combination with a lock, a magneto therein and key-controlled means for imparting to the armature of said magneto a rapid rotary movement, of a recorder, a circuit connecting the lock and recorder and a motor in the recorder with means operated by the magneto impulses for connecting said motor up in a local power circuit.

6. In a recording lock system, the combination with a lock and means controlled by the insertion of a key to close that one of a series of circuits of different resistance which corresponds to the key inserted, of a recorder, a generator therein, a double and oppositely wound relay and a circuit from said generator, one branch of which includes the key established circuit in the lock and one of said relay coils, and the other relay coil and a mechanically varied resistance, also in circuit with said other coil.

In testimony whereof I hereunto affix my signature.

JAMES W. BRYCE.